United States Patent [19]

Gardikes

[11] 4,273,179
[45] Jun. 16, 1981

[54] PHENOLIC RESIN-POLYISOCYANATE BINDER SYSTEMS CONTAINING DIBASIC ESTER SOLVENTS

[75] Inventor: John J. Gardikes, Worthington, Ohio

[73] Assignee: Ashland Oil, Inc., Ashland, Ky.

[21] Appl. No.: 934,287

[22] Filed: Aug. 16, 1978

[51] Int. Cl.³ .......................... C08K 5/09; C08K 5/10; B22C 1/22
[52] U.S. Cl. .................................. 164/43; 260/31.8 T
[58] Field of Search ..................... 260/31.8 T, 31.2 T; 164/43

[56] References Cited

U.S. PATENT DOCUMENTS

| | | | |
|---|---|---|---|
| 1,695,566 | 12/1928 | Turkington | 260/31.8 T |
| 2,321,766 | 6/1943 | Murdock | 260/31.8 T |
| 3,409,579 | 11/1968 | Robins | 260/30.4 R |
| 3,428,110 | 2/1969 | Walker et al. | 164/43 |
| 3,905,934 | 9/1975 | Gordliker | 260/31.8 T |

OTHER PUBLICATIONS

Chem. Abstracts, vol. 83, 1975 entry 98504(d) Mori, et al.
Huttener-Albertus (author) Chemische Werke GmbH, Trans by W. J. Strossen, 5/1/78.
Chemical Week, Aug. 24, 1968, pp. 33-34, vol. 103, No. 8.

*Primary Examiner*—Joseph L. Schofer
*Assistant Examiner*—Peter F. Kulkosky
*Attorney, Agent, or Firm*—T. Gene Dillahunty; Vernon F. Venne; William Kammerer

[57] ABSTRACT

Dibasic esters and blends of dibasic esters, particularly diethyl malonate, dimethyl adipate, dimethyl glutarate and dimethyl succinate are used as part or all of the solvent in solvent systems for two-package resin compositions comprising a phenolic resin component and a polyisocyanate hardener package and, in three-package systems.

19 Claims, No Drawings

PHENOLIC RESIN-POLYISOCYANATE BINDER SYSTEMS CONTAINING DIBASIC ESTER SOLVENTS

NATURE OF THE INVENTION

This invention relates to binder compositions particularly to binder compositions useful in the foundry art for making cores which are hardened at room temperature. In still another aspect the present invention relates to combinations of a foundry aggregate such as sand and a binder based on phenolic resins and polyisocyanates which on being formed into a coherent mass with the aggregate is capable of being cured at room temperature, by a gaseous curing agent.

PRIOR ART

U.S. Pat. No. 3,409,579 discloses binder compositions made available as two-package systems comprising a resin component in one package and a hardener component in the other package. The resin component comprises an organic solvent solution of phenolic resin. The hardener component comprises a liquid polyisocyanate having at least two isocyanate groups per molecule. At the time of use the contents of the two packages are combined and then mixed with the sand aggregate or preferably the packages are sequentially admixed with sand aggregate. After a uniform distribution of the binder on the sand particles has been obtained, the resulting foundry mix is molded into the desired shape. In the '579 patent the molded shape is cured by passing a gaseous tertiary amine through it.

In the '579 patent the preferred phenolic resins are benzylic ether resins. These are the condensation products of a phenol having the general formula:

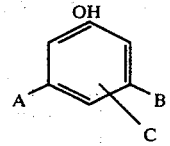

wherein A, B, and C are hydrogen, hydrocarbon radicals, oxyhydrocarbon radicals, or halogen, with an aldehyde having the general formula R'CHO wherein R' is a hydrogen or a hydrocarbon radical of 1 to 8 carbon atoms, prepared in the liquid phase under substantially anhydrous conditions at temperatures below about 130° C. in the presence of catalytic concentrations of a metal ion dissolved in the reaction medium. The preparation and characterization of these resins is disclosed in greater detail in U.S. Pat. No. 3,485,797.

In the preferred form, these resins have the general formula:

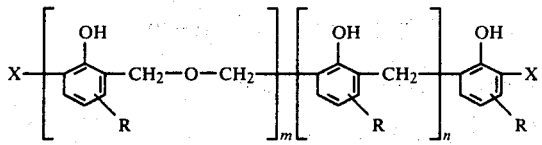

wherein R is hydrogen or a phenolic substituent, as described in U.S. Pat. Nos. 3,409,579 and 3,485,797, meta to the phenolic hydroxyl group, the sum of m and n is at least 2 and the ratio of m-to-n is at least 1, and X is an end-group from the group consisting of hydrogen and methylol, the molar ratio of said methylol-to-hydrogen end-groups being at least 1.

The phenolic resin component of the binder composition is, as indicated above, generally employed as a solution in an organic solvent.

The second component or package of the novel binder composition comprises an aliphatic, cycloaliphatic, or aromatic polyisocyanate having preferably from 2 to 5 isocyanate groups. If desired, mixtures of polyisocyanates can be employed. Less preferably, isocyanate prepolymers formed by reacting excess polyisocyanate with a polyhydric alcohol, e.g. a prepolymer of toluene diisocyanate and ethylene glycol, can be employed. Suitable polyisocyanates include the aliphatic polyisocyanates such as hexamethylene diisocyanate, alicyclic polyisocyanates such as 4,4'-dicyclohexylmethane diisocyanate, and aromatic polyisocyanates such as 2,4' and 2,6-toluene diisocyanate, diphenylmethyl diisocyanate, and the dimethyl derivatives thereof. Further examples of suitable polyisocyanates are 1,5-naphthalene diisocyanate, triphenylmethane triisocyanate, xylylene diisocyanate, and the methyl derivatives thereof, polymethylenepolyphenol isocyanates, chlorophenylene-2,4-diisocyanate, and the like. Although all polyisocyanates react with the phenolic resin to form a cross-linked polymer structure, the preferred polyisocyanates are aromatic polyisocyanates and particularly diphenylmethane diisocyanate, triphenylmethane triisocyanate, and mixtures thereof.

The polyisocyanate is employed in sufficient concentrations to cause the curing of the phenolic resin. In general, the polyisocyanate will be employed in a range of 10 to 500 weight percent of polyisocyanate based on the weight of the phenolic resin. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of up to 80% by weight of the solution.

Although the solvent employed in combination with either the phenolic resin or the polyisocyanate or for both compounds does not enter to any significant degree into the reaction between the isocyanate and the phenolic resin in the presence of the curing agent, it can affect the reaction. Thus the difference in the polarity between the polyisocyanate and the phenolic resin restricts the choice of solvents in which both components are compatible. Such compatibility is necessary to achieve complete reaction and curing of the binder compositions of the present invention. Polar solvents of either the protic or aprotic type are good solvents for the phenolic resin, but have limited compatibility with the polyisocyanates. Aromatic solvents, although compatible with the polyisocyanates, are less compatible with the phenolic resins. It is therefore preferred to employ combinations of solvents and particularly combinations of aromatic and polar solvents.

Aromatic solvents stated in the '579 patent to be suitable are benzene, toluene, xylene, ethylbenzene, and mixed solvents having an aromatic content of at least 90% and a boiling point range of 280° to 450° F. Suitable polar solvents are stated to be furfural, furfuryl alcohol, Cellosolve acetate, butyl Cellosolve, butyl Carbitol, diacetone alcohol and "Texanol". Isophorone ($C_9H_{14}O$) and other cyclic ketones more recently have proved to be excellent polar solvents for the resin. Unfortunately, isophorone and these other cyclic ketone solvents have an offensive odor which is carried over into the resin solutions made with them. Kerosene and other aliphatic solvents have also been used as components of the solvent system. Minor portions of releasing agents and adhesion promoters, (silane compounds) added to the solvent system have also proved useful.

The solvent used can also have an influence upon the properties of the cured aggregates made using the binder composition. For example, in U.S. Pat. No. 3,905,934 it is taught that dialkyl phthalate esters used as solvents in a binder composition such as the subject of the '579 patent would impart an improvement in out-of-box strength.

SUMMARY OF THE INVENTION

It has now been discovered that the dibasic esters are an excellent solvent for the resin component or polyisocyanate component of the two-package system. Completely unexpected, however, are improvements in the bench strength of aggregates coated with the above-described benzylic ether resins-polyisocyanate composition using dibasic esters as a solvent for the resin composition.

In one aspect, then, this invention comprises solvent combinations of dibasic esters with non-polar solvents of the prior art and with or without other polar solvents. Optionally various aliphatic solvents such as kerosene, and optionally various releasing agents and coupling agents can be included. These solvent combinations can be used as the solvent carrier for the resin component or the hardener component of a two-package resin composition.

In another aspect, then, this invention comprises binder compositions comprising an admixture of a resin component, a hardener component, and a curing agent, any or all of the components being dissolved in a combination of liquid solvents including one or more dibasic esters. The other components of the solvent mixture can be other aromatic solvents, the polar solvents of the aforedescribed prior art, aliphatic solvents such as kerosene, and optionally various releasing agents and coupling agents. Although the bulk of this disclosure pertains to the use of dibasic esters as part of the solvent for the resin component, as noted previously the hardener component can also be dissolved in a solvent mixture containing dibasic esters.

The resin component of a two- or three-package binder system preferably is a non-aqueous phenolic resin which comprises a condensation product of a phenol having the general formula:

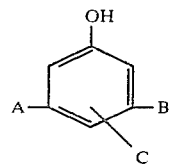

wherein A, B, and C are hydrogen, hydrocarbon radicals, oxyhydrocarbon radicals or halogen, with an aldehyde having the general formula R'CHO wherein R' is a hydrogen or hydrocarbon radical of 1 to 8 carbon atoms. Preferably in a two- or three-package binder system the bulk of the polar solvents in the over all system is used primarily in the first or resin component package along with aromatic solvents of the prior art.

The hardener component comprises liquid polyisocyanate or a solution thereof containing at least two isocyanate groups. The solvent for this latter component is either a combination of prior art solvents or can include some quantity of dibasic ester. The curing agent is a gaseous tertiary amine of the prior art.

In another aspect, this invention comprises a foundry mix containing sand as the major constituent and a binding amount of up to 10% based on the weight of sand of the aforesaid binder composition.

In still another aspect, this invention comprises the process of preparing shaped foundry products which comprises:

(a) forming a foundry mix by uniformly distributing on a foundry aggregate containing sand as the major constituent a binding amount of up to 10% based on the weight of the aggregate of the aforedescribed binder composition of phenolic resin component and hardener component polyisocyanate, said polyisocyanate being employed in a concentration of 10 to 500% by weight of the phenolic resin;

(b) shaping the foundry mix in a mold; and, (c) curing the binder in said foundry mix. The preferred weight ratio of polyisocyanate is that which is equivalent to a stoichiometric balance or equivalence between hydroxyl and isocyanate.

DETAILED DESCRIPTION OF THE INVENTION

Essentially the basis of this invention is the discovery that the use of dibasic ester or mixtures of dibasic esters for at least a portion of the solvent in the benzylic ether-polyisocyanate compositions of U.S. Pat. 3,490,579 results in a coated aggregate of improved bench life. This is particularly true when a mixture of the dibasic esters comprising dimethyl adipate, dimethyl glutarate and dimethyl succinate is used. Such a mixture is commercially available from E. I. duPont and Company under the trade designation DBE-2.

Referring to the two-package system the concentration of solvent containing the dibasic ester or dibasic ester mixture in the first component resin package will be in the range of up to 80% by weight of the resin solution and preferably in the range of 20 to 80%. The percent by weight of dibasic ester in the solvent mixture can be between about 10 and about 100. It is preferred to keep the viscosity of this first component at less than X-1 on the Gardiner-Holt Scale.

The dibasic esters used as a solvent in this invention have the structure, in their preferred forms of

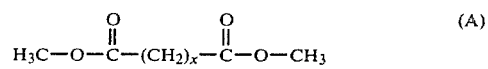

where X equals 2, 3 or 4. and

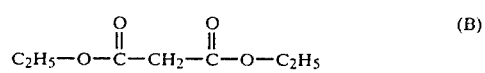

Of the two forms the preferred solvent is A and X will be primarily 3 and 4. In general the dibasic esters of the invention have the general formula:

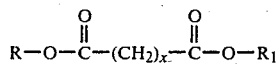

where X=1, 2, 3 or 4 and R and $R_1$ are alkyl groups having from one to four carbon atoms.

The second component of package of the binder composition will be the polyisocyanate composition described above in the Prior Art section. It is used in sufficient concentration to cause curing of the phenolic resin. In general, the polyisocyanate will be employed in a range of 10 to 500 weight percent based on the weight of phenolic resin. Preferably from 20 to 300 weight percent of polyisocyanate on the same basis is employed.

The polyisocyanate is employed in liquid form. Liquid polyisocyanates can be employed in undiluted form. Solid or viscous polyisocyanates are employed in the form of organic solvent solutions, the solvent being present in a range of up to 80% by weight of the solution.

The aggregate, e.g. sand, is usually the major constituent and the binder portion constitutes a relatively minor amount, generally less than 10%, frequently within the range of 0.25 to about 5%, these figures being based on the weight of the aggregate. Although the sand employed is preferably dry sand, moisture of up to about 1 weight percent based on the weight of the sand can be tolerated. This is particularly true if the solvent employed is non-water miscible or if an excess of the polyisocyanate necessary for curing is employed, since such excess polyisocyanate will react with the water. Some very fine sands or aggregates other than sand may require larger amounts of binder.

The binder components are combined and then admixed with sand or a similar foundry aggregate to form the foundry mix or the foundry mix can also be formed by sequentially admixing the components with the aggregate. Methods of distributing the binder on the aggregate particles are well-known to those skilled in the art. The foundry mix can, optionally, contain other ingredients such as iron oxide, ground flax fibers, wood cereals, pitch, refractory flours, and the like.

The resulting foundry mix is then molded into the desired core or shape, whereupon it can be cured. Curing is effected by passing a tertiary amine through the molded mix as described in U.S. Pat. No. 3,409,579.

As stated the use of dibasic esters or mixtures of dibasic esters as solvents for either the benzylic ether resin or the polyisocynate component results in an unexpected improvement in the bench life of a coated aggregate. In forming a foundry core using the teaching of the '579 patent the aggregate, usually sand, is coated uniformly with the resin component, which includes a solvent; and the hardener component, which also includes a solvent. The resulting mix of aggregate, resin and hardener is then molded into a desired shape. The shape is then cured by passing a gaseous tertiary amine catalyst through it. However, once the sand is coated and the mix formed the reaction or hardening beings without the help of the catalyst. Due to this, passage of time and the accompanying slow reactions, the tensile strength of the cores formed by gasing previously known mixes with catalyst is decreased compared to the tensile strength of a core produced from a mix which is cured immediately upon formation. That is to say, using the resin and polyisocyanate components of the prior art to coat the aggregate material (sand) resulted in a mix in which the tensile strength of the cured core produced by catalyzing the mix decreased as the sand mix aged. The length of time during which a sand mix may be used to form desired core patterns equal to or above a desired tensile strength is known in the trade as "bench life". Further, the reaction can proceed to such an extent that the sand mixture will be "shot" i.e. so unflowable that it can not be blown to make a core.

Unexpectedly the use of dibasic ester solvents has resulted in sand mixes, which upon curing by gaseous catalyst produce cores which, up to a point, show an increase in time during which acceptable tensile strengths may be obtained. This has resulted in sand mixes which have bench lives nearly twice as long as the mixes known in the prior art. Other improvements attributable to use of dibasic ester solvents include improved flowability, improved core compaction density and improved humidity resistance. The only disadvantage involved with using the dibasic ester solvents appears to be a tendency for the resin to "wipe off" the aggregate. This tendency may be overcome by techniques in the processing the sand mix.

The reason for the improved bench life is not known. In general it is known that in practicing the '579 patent increasing levels of solvents tends to improve bench life performance. However at identical solvent levels the mixes prepared from resin components and polyisocyanate components having dibasic esters solvents do not increase in viscosity with time as rapidly as comparable mixes formulated with other types of solvents. The slower rate of increase of viscosity is thought to be the reason for the extended bench life performance of the mixes prepared utilizing dibasic ester solvents when compared to standard commercial products. The dibasic ester solvents are especially useful when a longer bench life is needed because a sand, which normally provides short bench life with prior art binders, is utilized; or the temperatures of the work area is high.

Although it is feasible to use the dibasic esters of this invention as the sole solvent in either the resin component or the polyisocyanate component, it is preferable to use the dibasic esters in combination with other solvents. Typically the dibasic esters are used in combination with aromatic solvents, polar solvents and kerosene. The most commonly used polar solvent is furfuryl alcohol. This mixture of solvents is thought to improve the strength and humidity resistance properties over that which could be obtained using a dibasic ester solvent above.

A valuable additive to the binder compositions of the present invention in certain types of sand is a silane having the general formula:

wherein R' is a hydrocarbon radical and preferably an alkyl radical of 1 to 6 carbon atoms and R is an alkyl radical, an alkoxy-substituted alkyl radical, or an alkyl-amine-substituted alkyl radical in which the alkyl groups have from 1 to 6 carbon atoms. The aforesaid silane, when employed in concentrations of 0.1 to 2% based on the phenolic binder and hardener, improves the adhesion of the phenolic binder to the foundry aggregate particle.

EXAMPLES

The present invention is further illustrated by the following examples in which all parts and percentages are by weight unless otherwise indicated. Foundry sand mixes were prepared by first admixing a commercial benzylic ether resin with other components as shown in Table I to make a resin component for a two-package system. For comparison purposes a mixture of the same benzylic ether resin, with the dibasic ester solvent replaced by another solvent which is conventionally used and the same additional components were also prepared. These mixtures were then blended with Port Crescent sand in the proportions shown for about 2 minutes. Next a commercial solution of isocyanate was blended into the mix for about 2 minutes. The resulting sand mixes were used after the time intervals indicated below. The foundry sand mixes were formed into standard AFS tensile test samples using the standard procedure of blowing the sand mix into a box. The resulting test samples were then cured by treatment with dimethyl ethyl amine. The samples were then tested for tensile strength at the intervals indicated in Table I.

TABLE I

| Run No. | 1 | 2 | 3 |
|---|---|---|---|
| RESIN COMPOSITION | | | |
| Benzylic Ether Resin | 47 | 47 | 47 |
| Aromatic Solvent | 31 | 31 | 31 |
| Kerosene | 2 | 2 | 2 |
| Furfuryl Alcohol | 5 | 5 | 5 |
| DBE-2 | 15 | — | — |
| Diethyl Malonate | — | 15 | — |
| Dibutyl Phthalate | — | — | 15 |
| FOUNDRY SAND MIX COMPOSITION | | | |
| Wedron Sand | 7000g | 7000g | |
| Polyisocyanate | 52.5g | 52.5g | |
| Resin | 52.5g | 52.5g | |
| Curing Conditions | | | |
| Time Gased with | | | |
| Dimethyl ethyl amine, secs | 1 | 1 | |
| Gas Purge Time, secs. | 4 | 4 | |
| Tensile Strength | | | |
| (immediately or out of box) time after sand mix prepared, psi | | | |
| immediate use | 113 | 113 | 105 |
| 1 hr. | 102 | 92 | 95 |
| 2 hr. | 97 | 83 | 67 |
| 3 hr. | 75 | 65 | 50 |
| 4 hr. | 70 | 55 | —(mix could not be blown |
| 5 hr. | 58 | 52 | —due to lack of flowability of the mix) |

A comparison of the bench life of sand mixes where the solvents of this invention were present with the bench life of the sand mix omitting the solvents of this invention demonstrates the improvement obtained by utilization of the solvents disclosed herein. It can be seen by contrasting Runs 1 and 2 with Run 3 that used of the dibasic esters described herein results in an increase in bench life of at least 60%. Thus, cores of sufficient tensile strengths were able to be made using sand mixes which has been prepared for use five hours before use when dibasic esters were used as solvents. However, substitution of another solvent for those of this invention resulted in cores which were of lower tensile strength three hours after sand mix preparation. Further the mix, in which the solvents of this invention were not used, was "shot" after four hours, indicating that the mix was too heavy or so unflowable that it could not be blown into a core box indicating that the useful period of time after sand mix preparation or bench life was three hours.

What is claimed is:

1. A binder composition comprising in admixture a resin component, a hardener component, and a curing component, said resin component comprising a solution of resin in an organic solvent (comprising at least a dibasic ester of) said solvent comprising a dibasic ester having the following formula:

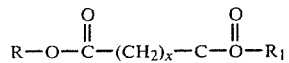

wherein X is 1, 2, 3, or 4, R is an alkyl group of from one to four carbon atoms and $R_1$ is an alkyl group of from one to four carbon atoms and said resin is a non-aqueous phenolic resin which comprises a condensation product of a phenol having the general formula:

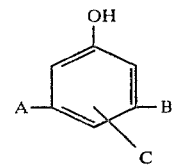

wherein A, B, and C are hydrogen, hydrocarbon radicals or halogen, with an aldehyde having the general formula R'CHO wherein R' is a hydrogen or a hydrocarbon radical of 1 to 8 carbon atoms; said hardener component comprising a liquid polyisocyanate containing at least two isocyanate groups; and said curing component comprising a tertiary amine.

2. The binder composition of claim 1, wherein the aldehyde is formaldehyde.

3. The binder composition of claim 1, wherein the aldehyde is formaldehyde, and A and B are hydrogen, and C is a hydrocarbon radical.

4. The binder composition of claim 1, wherein the aldehyde is formaldehyde and A, B, and C are hydrogen.

5. The binder composition of claim 1, wherein the phenolic resin is a novolak resin.

6. The binder composition of claim 1, wherein the phenolic resin is a resole resin.

7. The binder composition of claim 1, wherein the dibasic ester is selected from the group consisting of dimethyl adipate, dimethyl glutarate and dimethyl succinate.

8. The composition of claim 1 wherein the dibasic ester is diethyl malonate.

9. The composition of claim 1 wherein the dibasic ester is selected from the group consisting of diethyl malonate, dimethyl adipate, dimethyl glutarate and dimethyl succinate and mixtures thereof.

10. The binder composition of claim 1, wherein the phenolic resin has the general formula:

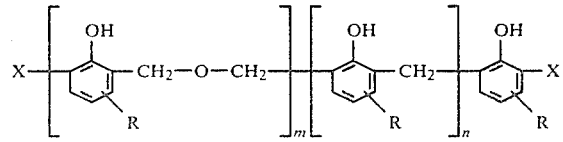

wherein R is hydrogen or a phenolic substituent meta to the hydroxyl group of the phenol, m and n are numbers the sum of which is at least 2, and the ratio of m-to-n is at least 1, and X is a hydrogen or a methylol group, the molar ratio of said methylol group-to-hydrogen being at least 1.

11. The binder composition of claim 10 wherein R is hydrogen.

12. The binder composition of claim 1, wherein the polyisocyanate is an aromatic polyisocyanate.

13. The binder composition of claim 12, wherein the aromatic polyisocyanate is diphenylmethane diisocyanate.

14. The binder composition of claim 10, wherein the polyisocyanate is an aromatic polyisocyanate.

15. The binder composition of claim 1, wherein the solvent includes at least one non-polar solvent.

16. The binder composition of claim 1, wherein the curing agent is a tertiary amine.

17. A foundry mix containing sand as the major constituent and a binding amount of up to 10% based on the weight of sand of the binder of claim 1.

18. A foundry mix containing sand as the major constituent and a binding amount of up to 10% based on the weight of sand of the binder of claim 10.

19. The process of preparing shaped foundry products which comprises:
(a) forming a foundry mix by uniformly distributing on a foundry aggregate containing sand as the major constituent a binding amount of upto 10% based on the weight of the aggregate of a binder composition obtained by combining the phenolic resin component of claim 1 and the hardener component of claim 1, said polyisocyanate being employed in a concentration of 10 to 500% by weight of the phenolic resin;
(b) shaping the foundry mix in a mold; and
(c) curing the shaped foundry mix with a gaseous tertiary amine catalyst.

* * * * *